United States Patent [19]

Matsen et al.

[11] Patent Number: 5,587,098
[45] Date of Patent: Dec. 24, 1996

[54] JOINING LARGE STRUCTURES USING LOCALIZED INDUCTION HEATING

[75] Inventors: Marc R. Matsen, Seattle; Richard J. Poel, Kent; Wesley B. Crow; David S. Nansen, both of Bellevue, all of Wash.

[73] Assignee: The Boeing Company, Seattle, Wash.

[21] Appl. No.: 481,094

[22] Filed: Jun. 7, 1995

Related U.S. Application Data

[63] Continuation-in-part of Ser. No. 169,655, Dec. 16, 1993, Ser. No. 92,050, Jul. 15, 1993, Pat. No. 5,410,133, and Ser. No. 151,433, Nov. 12, 1993, Pat. No. 5,420,400, said Ser. No. 169,655, is a continuation-in-part of Ser. No. 777,739, Oct. 15, 1991, Pat. No. 5,410,132, said Ser. No. 92,050, is a division of Ser. No. 681,004, Apr. 5, 1991, Pat. No. 5,229,562.

[51] Int. Cl.⁶ ................................................ B23K 13/01
[52] U.S. Cl. ......................... 219/615; 219/633; 219/634; 219/645
[58] Field of Search .................................. 219/603, 604, 219/615, 617, 633, 634, 635, 645

[56] References Cited

U.S. PATENT DOCUMENTS

| | | |
|---|---|---|
| 2,841,678 | 7/1958 | Thorson . |
| 2,984,732 | 5/1961 | Herbert . |
| 3,037,105 | 5/1962 | Kohler . |
| 3,124,672 | 3/1964 | Sommer et al. . |
| 3,127,674 | 4/1964 | Kohler . |
| 3,129,459 | 4/1964 | Kullgren et al. . |
| 3,340,101 | 9/1967 | Fields, Jr. et al. . |
| 3,365,184 | 1/1968 | Willens . |
| 3,395,261 | 7/1968 | Leatherman et al. ................... 219/633 |
| 3,395,993 | 8/1968 | Bristow . |
| 3,444,275 | 5/1969 | Willett . |
| 3,466,726 | 9/1969 | Savolainen . |
| 3,529,458 | 9/1970 | Butler et al. . |
| 3,547,751 | 12/1970 | Morgan . |
| 3,574,031 | 4/1971 | Heller et al. ........................... 219/633 |
| 3,595,060 | 7/1971 | Hundy . |
| 3,605,477 | 9/1971 | Carlson . |
| 3,615,277 | 10/1971 | Kreider et al. . |
| 3,639,974 | 2/1972 | Finnegan . |
| 3,890,819 | 6/1975 | DeLuca . |
| 3,895,436 | 7/1975 | Summers et al. . |
| 3,900,150 | 8/1975 | Delgrosso et al. . |
| 3,919,764 | 11/1975 | Berghezan . |
| 3,920,175 | 11/1975 | Hamilton et al. ....................... 228/173 |
| 3,924,793 | 12/1975 | Summers et al. . |
| 3,927,817 | 12/1975 | Hamilton et al. ....................... 228/157 |
| 3,934,441 | 1/1976 | Hamilton et al. . |
| 3,974,673 | 8/1976 | Fosness et al. . |
| 3,981,427 | 9/1976 | Brookes . |
| 3,996,019 | 12/1976 | Cogan . |

(List continued on next page.)

FOREIGN PATENT DOCUMENTS

1418327 12/1975 United Kingdom .

OTHER PUBLICATIONS

Jones, "Mechanics of Composite Materials," McGraw–Hill (1975) pp. 4–5.

Smith, et al., "Developments in Titanium Metal Matrix Composites," Journal of Metals, Mar., 1984, pp.. 19–26.

Quarterly Government Report for Sep., 1992 through Nov.

Border, et al., "Induction Heated joining of Thermoplastic Composites Without Metal Susceptors," *34th International SAMPE Symposium*, May 8–11, 1989, pp. 2569–2578.

Sumida, et al., "Pan Based High Modulus Graphitized Carbon Fiber Torayca M60J", *34th International SAMPE Symposium*, May 8–11, 1989, pp. 2579–2589.

*Primary Examiner*—Tu Hoang
*Attorney, Agent, or Firm*—John C. Hammar

[57] ABSTRACT

A narrow susceptor is incorporated into the die in the vicinity of a bondline between two or more parts in an induction heating workcell. When the induction coil of the workcell is energized, the susceptor heats and preferentially heats the parts near the bondline. The preferential heating is localized at the bondline and reduces energy losses otherwise expended to heat large thermal masses in the workcell or to heat the entire parts.

20 Claims, 5 Drawing Sheets

U.S. PATENT DOCUMENTS

| | | | |
|---|---|---|---|
| 4,029,838 | 6/1977 | Chamis et al. . | |
| 4,039,794 | 8/1977 | Kasper . | |
| 4,111,024 | 9/1978 | Dahlman et al. . | |
| 4,117,970 | 10/1978 | Hamilton et al. . | |
| 4,141,484 | 2/1979 | Hamilton et al. . | |
| 4,145,903 | 3/1979 | Leach et al. . | |
| 4,188,811 | 2/1980 | Brimm . | |
| 4,217,397 | 8/1980 | Hayase et al. . | |
| 4,219,477 | 7/1980 | Gillespie et al. . | |
| 4,233,829 | 11/1980 | Hamilton et al. . | |
| 4,233,831 | 11/1980 | Hamilton et al. . | |
| 4,263,087 | 4/1981 | Tanabe et al. . | |
| 4,263,375 | 4/1981 | Elrod . | |
| 4,269,053 | 5/1981 | Agrawal et al. . | |
| 4,304,821 | 12/1981 | Hayase . | |
| 4,305,449 | 12/1981 | Loszewski . | |
| 4,306,436 | 12/1981 | Schulz et al. . | |
| 4,307,276 | 12/1981 | Kurata et al. . | |
| 4,331,284 | 5/1982 | Schulz et al. . | |
| 4,340,650 | 7/1982 | Pattanaik et al. . | |
| 4,351,470 | 9/1982 | Swadling et al. . | |
| 4,352,280 | 10/1982 | Ghosh . | |
| 4,354,369 | 10/1982 | Hamilton . | |
| 4,361,262 | 11/1982 | Israeli . | |
| 4,398,659 | 8/1983 | Richter . | |
| 4,426,032 | 1/1984 | Leodolter . | |
| 4,426,033 | 1/1984 | Mizuhara . | |
| 4,447,690 | 5/1984 | Grever . | |
| 4,454,402 | 6/1984 | Sander et al. . | |
| 4,468,549 | 8/1984 | Arnosky . | |
| 4,474,044 | 10/1984 | Leistner et al. . | |
| 4,499,156 | 2/1985 | Smith et al. . | |
| 4,542,272 | 9/1985 | Hubbard . | |
| 4,563,145 | 1/1986 | de Meij . | |
| 4,584,860 | 4/1986 | Leonard . | |
| 4,602,731 | 7/1986 | Dockus . | |
| 4,603,089 | 7/1986 | Bampton . | |
| 4,603,808 | 8/1986 | Stacher . | |
| 4,610,934 | 9/1986 | Boecker et al. . | |
| 4,621,761 | 11/1986 | Hammond et al. . | |
| 4,622,445 | 11/1986 | Matsen | 219/615 |
| 4,630,767 | 12/1986 | Mizuhara . | |
| 4,649,249 | 3/1987 | Odor . | |
| 4,657,717 | 4/1987 | Cattanach et al. . | |
| 4,698,271 | 10/1987 | Moorhead . | |
| 4,699,849 | 10/1987 | Das . | |
| 4,713,953 | 12/1987 | Yavari . | |
| 4,745,245 | 5/1988 | Kitaide et al. . | |
| 4,754,114 | 6/1988 | Sommer et al. . | |
| 4,797,155 | 1/1989 | Das . | |
| 4,888,973 | 12/1989 | Comley . | |
| 4,889,276 | 12/1989 | Cadwell et al. . | |
| 4,901,552 | 2/1990 | Ginty et al. . | |
| 4,913,910 | 4/1990 | McCarville et al. . | |
| 4,934,581 | 6/1990 | Ibe et al. . | |
| 4,955,803 | 9/1990 | Miller et al. . | |
| 4,984,348 | 1/1991 | Cadwell . | |
| 4,988,037 | 1/1991 | Cadwell . | |
| 5,024,369 | 6/1991 | Froes et al. . | |
| 5,047,605 | 9/1991 | Ogden . | |
| 5,118,026 | 6/1992 | Stacher . | |
| 5,229,562 | 7/1993 | Burnett et al. | 219/633 |
| 5,240,542 | 8/1993 | Miller et al. | 156/272.4 |
| 5,248,864 | 9/1993 | Kodokian | 219/615 |
| 5,313,034 | 5/1994 | Grimm et al. | 219/765 |
| 5,420,400 | 5/1995 | Matsen | 219/615 |

JOINING LARGE STRUCTURES USING LOCALIZED INDUCTION HEATING

REFERENCE TO RELATED APPLICATIONS

The present application is a continuation-in-part application based upon U.S. patent application Ser. No. 08/169,655, filed Dec. 16, 1993 (which was a continuation-in-part application of U.S. patent application Ser. No. 07/777,739, filed Oct. 15, 1991, now U.S. Pat. No. 5,410,132). The present application also is a continuation-in-part application based upon U.S. patent application Ser. No. 08/092,050, filed Jul. 15, 1993 now U.S. Pat. No. 5,410,133 (a divisional of U.S. patent application Ser. No. 07/681,004, filed Apr. 5, 1991, now U.S. Pat. No. 5,229,562). Finally, the present application is also a continuation-in-part application based upon U.S. patent application Ser. No. 08/151,433, filed Nov. 12, 1993, now U.S. Pat. No. 5,420,400. We incorporate these applications and patents by reference.

TECHNICAL FIELD

The present invention is a method for to joining large metal structures using localized induction heating to heat the joint or bondline efficiently and rapidly and hydraulic rams to create high pressures at the bondline. In particular, the method involves brazing.

BACKGROUND ART

The tools or dies for metal processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed after producing only a few parts of each kind.

Airplanes are commonly made from metal or composite with prefabricated parts assembled and fastened or riveted together. The labor cost for fastening is a significant cost element and the fasteners add weight that limits overall performance and capability or adversely impacts operational costs. For military aircraft, weight translates to payload/range which is critical with modern technology where a small advantage can mean the difference between success and failure. For commercial aircraft, while weight does not translate to survivability, it is still a significant factor because the capital cost plus the operating cost are the key elements of the airline's expense. For large structure, like the wing-carry-through structure, even fastening isn't available. Instead, these structures that must be produced to close tolerance are made by electron beam welding or diffusion bonding in a hot press. Both processes are expensive and are plagued with difficulties. Electron beam welding imposes post weld stress relief requirements, weld inspection, and warpage straightening. In addition, the electron beam welding process requires expensive tooling to create closely machined joints and large "high vacuum" chambers. Hot press diffusion bonding suffers from difficulties in repeatability as well as high tooling costs, long cycle times, and inefficient energy consumption. Technologies to reduce cost and weight, accordingly, are dear in the aircraft industry. The present invention is a brazing operation using Boeing's induction heating workcell which promises significant cost and weight savings for the manufacture of large aerospace assemblies. With diffusion bonding, the entire part is heated which is problematical because it is important to hold dimensional tolerance when the complicated assembly softens. Localized heating would reduce the problems associated with heating the entire part and would conserve energy.

Commonly, in our induction heating operations, we use a retort of sealed susceptor sheets around the entire metal workpieces to control the atmosphere around the workpiece and to achieve uniform heating, as described in greater detain in U.S. Pat. No. 5,420,400 and U.S. patent application Ser. No. 08/452,216 entitled Combined Heating Cycles for Improving Efficiency in Induction Heating Operations, which we incorporate by reference. The susceptor is heated inductively and transfers its heat principally through conduction to the preform or workpiece that is sealed within the susceptor retort. While the metals in the workpiece may themselves be susceptible to induction heating, the metal workpiece needs to be shielded in an inert atmosphere during high temperature processing to avoid oxidation of the metal, so we usually enclose the workpiece (one or more metal sheets) in a metal retort when using our ceramic tooling induction heating press.

Induction focuses heating on the retort and workpiece and eliminates wasteful, inefficient heat sinks. Because the ceramic tools in our induction heating workcell do not heat to as high a temperature as the metal tooling of conventional, prior art presses, problems caused by different coefficients of thermal expansion between the tools and the workpiece are reduced. Furthermore, we are energy efficient because significantly higher percentages of our input energy goes to heating the workpiece than occurs with conventional presses. Our reduced thermal mass and ability to focus the heating energy permits us to change the operating temperature rapidly which improves the products we produce. Finally, our shop environment is not heated as significantly from the radiation of the large thermal mass of a conventional press.

We can perform a wide range of manufacturing operations in our induction heating press. These operations have optimum operating temperatures ranging from about 350° F. (175° C.) to about 1950° F. (1066° C). For each operation, we usually need to hold the temperature relatively constant for several minutes to several hours while we complete the operations. While we can achieve temperature control by controlling the input power fed to the induction coil, we have discovered a better and simpler way that capitalizes on the Curie temperature. By judicious selection of the metal or alloy in the retort's susceptor facesheets, we can avoid excessive heating. With improved control and improved temperature uniformity in the workpiece, we produce better products.

As described to some degree in U.S. Pat. No. 4,622,445 and in U.S. Pat. No. 5,410,132, we discovered an improvement for an SPF process coupling the use of ceramic dies with inductive heating. With our inductively heated SPF press or workcell, we can heat preferentially the sheet metal workpiece with induction heating without heating the platens or dies significantly and can use the ceramic dies as an insulator to hold the induced heat in the part. We can stop the heating at any time and can cool the part relatively quickly even before removing it from the die. We do not waste the energy otherwise required to heat the large thermal mass of the platens and dies. We do not force the press operators to work around the hot dies and platens. With our inductive heating workcell, we also save time and energy when changing dies to set up to manufacture different parts because the dies and platen are significantly cooler than those in a conventional SPF press. We shorten the operation to change dies by several hours. Therefore, the induction heating process is an agile work tool for rapid prototyping or low rate production with improved efficiency and versatility.

U.S. Pat. Nos. 3,920,175 and 3,927,817 describe typical combined cycles for SPF forming and diffusion bonding. Diffusion bonding is a notoriously difficult and temperamental process that has forced many SPF fabricators away from multisheet manufacturing or to "clean room" production facilities and other processing tricks to eliminate the possibility of oxidation in the bond. Oxides foul the integrity of the bond. In addition, diffusion bonds are plagued with microvoids which are difficult to detect nondestructively, but, if present, significantly diminish the structural performance of the joint. Diffusion bonding also is a time consuming process. The part typically must be held at elevated temperature and elevated pressure (about 400 psi) for several hours. For example, in U.S. Pat. No. 3,920,175, the diffusion bonding operation takes five hours at 1650° F. (900° C.), making the forming/bonding operation six hours. In U.S. Pat. No. 3,927,817, diffusion bonding occurs prior to forming, still requires four to five hours, and forces a six hour bonding/forming cycle at 1650° F. (900° C.) for the entire period. Typically a hot press diffusion bonding process for common titanium alloys used in aerospace applications will require over eight hours at 2500 psi and 800° C. (1472° F.), about six hours at 400 psi and 900° C. (1650° F.), or about two hours at 250–300 psi and 950° C. (1742° F.). Producing this heat and pressure for this length of time is expensive. Localized heating with higher localized pressure achieve a higher bonding force and a better bond in the process of the present invention.

The present invention is a timesaving process that promises higher quality parts at lower production costs with significant energy savings in shorter production times. The problems of hot press diffusion bonding are eliminated and more efficient manufacturing cycle is possible. Manufacturers have greater assurance in the integrity of the brazed bond so it prefer it. To achieve a satisfactory brazed bond quickly and reliably, we focus the heating on the part we are forming using an induction heater. We hold the part within insulating ceramic dies that are transparent to the time-varying magnetic field that our induction heater produces. We significantly reduce cycle time in manufacturing large aerospace parts.

SUMMARY OF THE INVENTION

Because of our capability with induction heating to rapidly heat and cool, we significantly reduce the processing time over conventional bonding operations in fabricating large metal aerospace structures by localizing heating on the bondline with a "smart" susceptor bond. We can shorten the joining operation from hours to no more than about 35–50 min. We generally join prefabricated metal parts having close overall dimensions and significant mass, like an aircraft forward boom, with a braze alloy. We heat the "smart" susceptor bond that we fabricate into the surface of the die in the proximity of the braze joint to a uniform temperature. This hot susceptor radiates heat to the bondline. When the workpiece reaches a temperature where the braze alloy in the bondline melts, we rapidly increase pressure with hydraulic rams. We focus heat on the bondline and obtain braze bonds comparable to electron beam welding at a fraction of the cost both in capital and cycle time without heating the entire workpiece and without losing overall dimensions so we avoid many of the problems of the prior art.

DETAILED DESCRIPTION OF A PREFERRED EMBODIMENT

Before describing our particular process, we will give some general background on the operation of our induction heating workcell.

1. The Induction Heating Process

Figure 1:
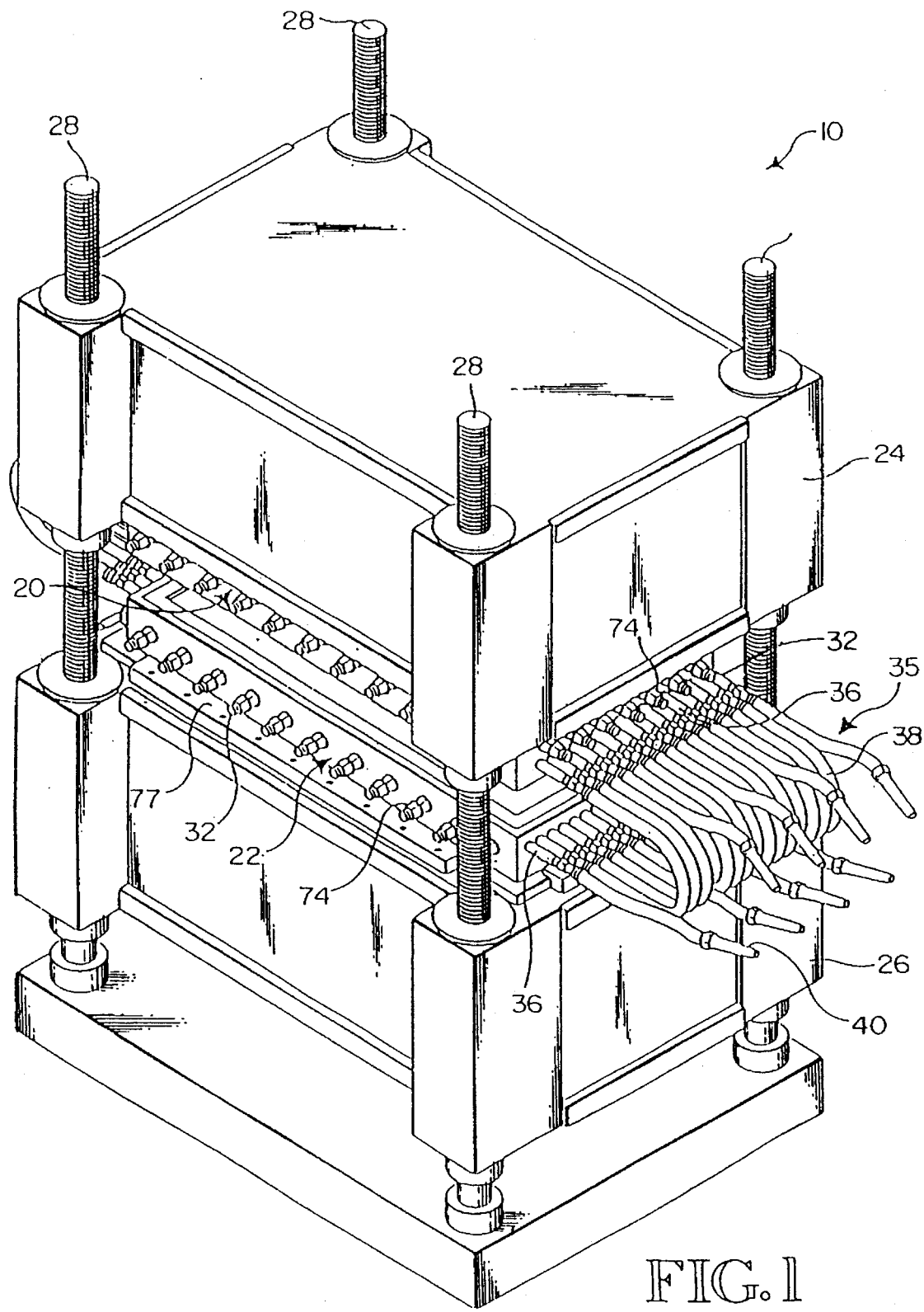
FIG. 1 is a perspective view of our induction heating workcell.
Figure 2:
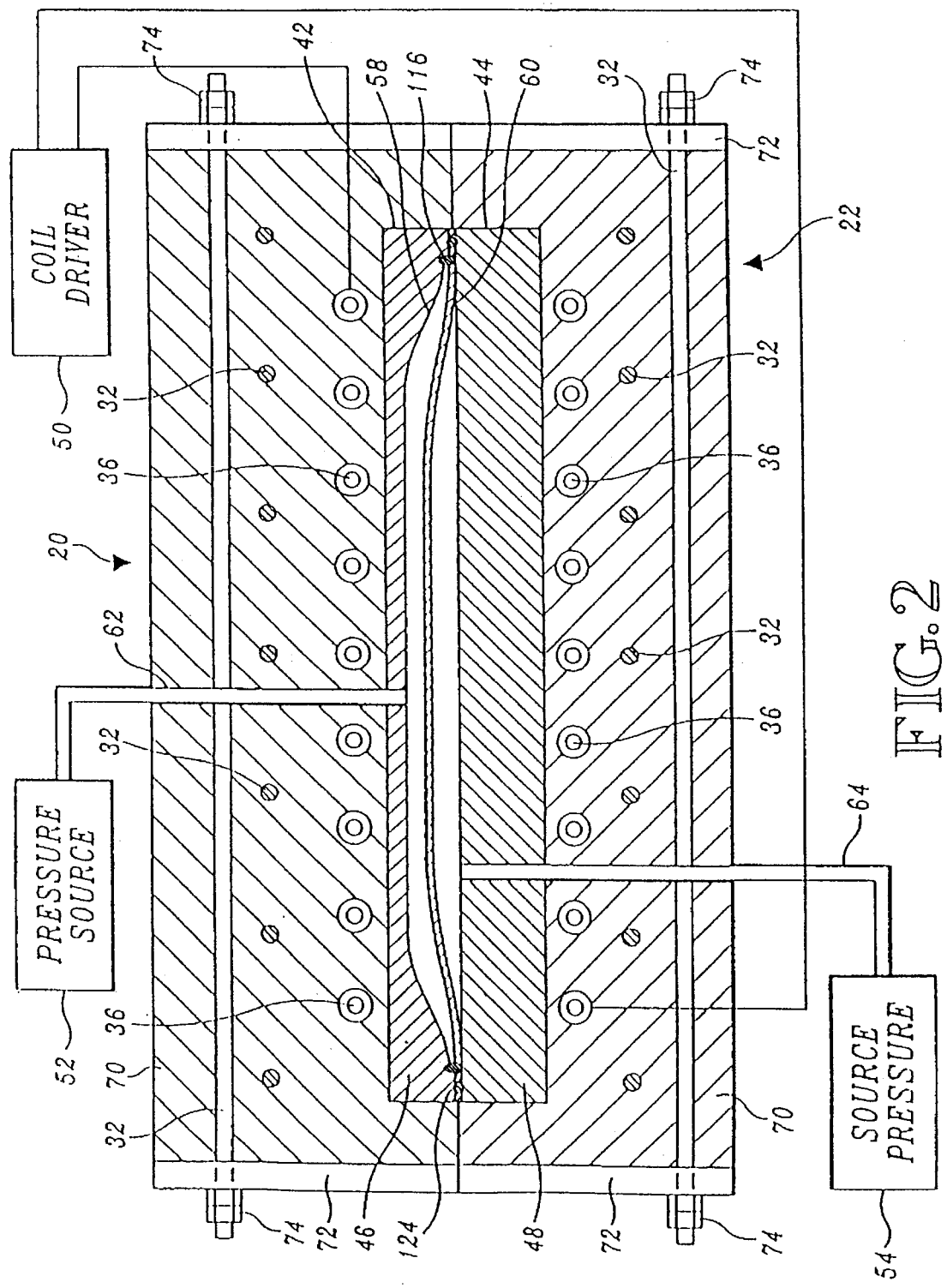
FIG. 2 is a schematic cross-sectional view of the apparatus of FIG. 1.

In FIGS. 1 and 2 an induction heating workcell 10 includes tools or dies 20 and 22 mounted within an upper 24 and a lower 26 strongback. The strongbacks are each threaded onto four threaded column supports or jackscrews 28 or they float free on the columns and are fixed with nuts. We can turn the jackscrews to move one strongback relative to the other. The strongbacks 24 and 26 provide a rigid, flat backing surface for the upper and lower dies 20 and 22 to prevent the dies from bending and cracking during manufacturing operations. Preferably, the strongbacks hold the dies to a surface tolerance of ±0.003 inches per square foot of the forming surface. Such tolerances are desirable to achieve proper part tolerances. The strongbacks may be steel, aluminum, or any other material capable of handling the loads present during forming or consolidation, but we prefer materials that are non-magnetic to avoid any distortion to the magnetic field that our induction coils produce. In some circumstances, the dies may be strong enough themselves that strongbacks are unnecessary. The strongbacks transfer pressure input through the columns evenly to the dies.

The dies 20 and 22 are usually ceramic and are reinforced with a plurality of fiberglass rods 32 that are held with bolts 74 and that extend both longitudinally and transversely in a grid through each die. Each die usually is framed with phenolic reinforcement 72 as well to maintain a compressive load on the die. Each die may be attached to its strongback by any suitable fastening device such as bolting or clamping. In the preferred embodiment, both dies are mounted on support plates 76 which are held in place on the respective strongbacks through the use of clamping bars 77. The clamping bars 77 extend around the periphery of the support plates 76 and are bolted to the respective strongbacks through the use of fasteners (not shown).

The dies should not be susceptible to inductive heating so that heating is localized in the retort. We prefer a ceramic that has a low coefficient of thermal expansion, good thermal shock resistance, and relatively high compression strength, such as a castable fused silica ceramic.

We embed portions of an induction coil 35 in the dies. In the illustrated embodiment, we use four separate induction segments, but the number can vary. Each segment is formed from a straight tubing section 36 that extends along the length of each die and a flexible coil connector 38 that joins the straight tubing sections 36 in the upper die 20 to the corresponding straight tubing section in the lower die 22. Connectors 40 located at the ends of the induction coil 35 connect the induction coil 35 to an external power source or coil driver 50 and to a coolant source.

Each die surrounds and holds the straight sections 36 of the induction coil in proper position in relationship to the tool insert 46 or 48. In the preferred embodiment, the interior 70 of the dies is formed of a castable ceramic and the exterior sides from precast composite phenolic resin blocks 72.

Pin holes (not shown) in the dies vent gas trapped between the retort 60 and the forming surface 58 as the retort deforms. Such pin holes can be coupled to a flow meter to monitor the progress of the deformation.

When the operation is complete, the induction coil 35 is de-energized and the pressure relieved. The tool inserts and dies are separated. We remove the formed retort 60 from the press and recover the composite part from between the susceptor facesheets.

An alternating oscillating electrical current in the induction coil 35 produces a time varying magnetic field that heats the susceptor sheets of the retort via eddy current heating. The frequency at which the coil driver 50 drives the coils 35 depends upon the nature of the retort 60. We power the coil with up to about 400 kW at frequencies of between about 3–10 kHz. Current penetration of copper at 3 kHz is approximately 0.06 inches (1.5 mm), while penetration at 10 kHz is approximately 0.03 inches (0.75 mm).

The shape of the coil has a significant effect upon the magnetic field uniformity. Field uniformity usually is important because temperature uniformity induced in the retort is directly related to the uniformity of the magnetic field. Uniform heating insures that different portions of the workpiece will reach the operating temperature at approximately the same time. Solenoid type induction coils like those we illustrate provide a uniform magnetic field, and are preferred. Greater field uniformity is produced in a retort that is located symmetrically along the centerline of the surrounding coil. Those of ordinary skill can establish series/parallel induction coil combinations, variable turn spacing, and distances between the part and the induction coil by standard electrical calculations to achieve the desired heating from whatever coil configuration is used.

The dies are usually substantially thermally insulating and trap and contain heat within the retort. Since the dies and tool inserts are not inductively heated and act as insulators to maintain heat within the retort, the present invention requires far less energy to achieve the desired operating temperature than conventional autoclave or resistive hot press methods where the metal tooling is a massive heat sink.

Bonding operations using our workcell are faster than prior art operations because we do not heat the large thermal mass of either the dies or tool inserts. The retort is heated, the tool is not. Thus, the necessary processing temperature is achieved more rapidly. In addition, the highly conductive materials in the retort provide rapid heat transfer to the workpiece. When the driver 50 is de-energized, the dies and the retort cool rapidly to a temperature at which we can remove the retort from the workcell, saving time and energy over conventional systems. Coolant flowing through the coil tubes functions as an active heat exchanger to transfer heat out of the workpiece, retort, and dies. In addition, the thermal cycle is not as limited by the heating and cooling cycle of the equipment and tools so we can tailor the thermal cycle better to the process for which we are using the induction heating workcell.

2. Joining Large Aerospace Structure

Figure 3:
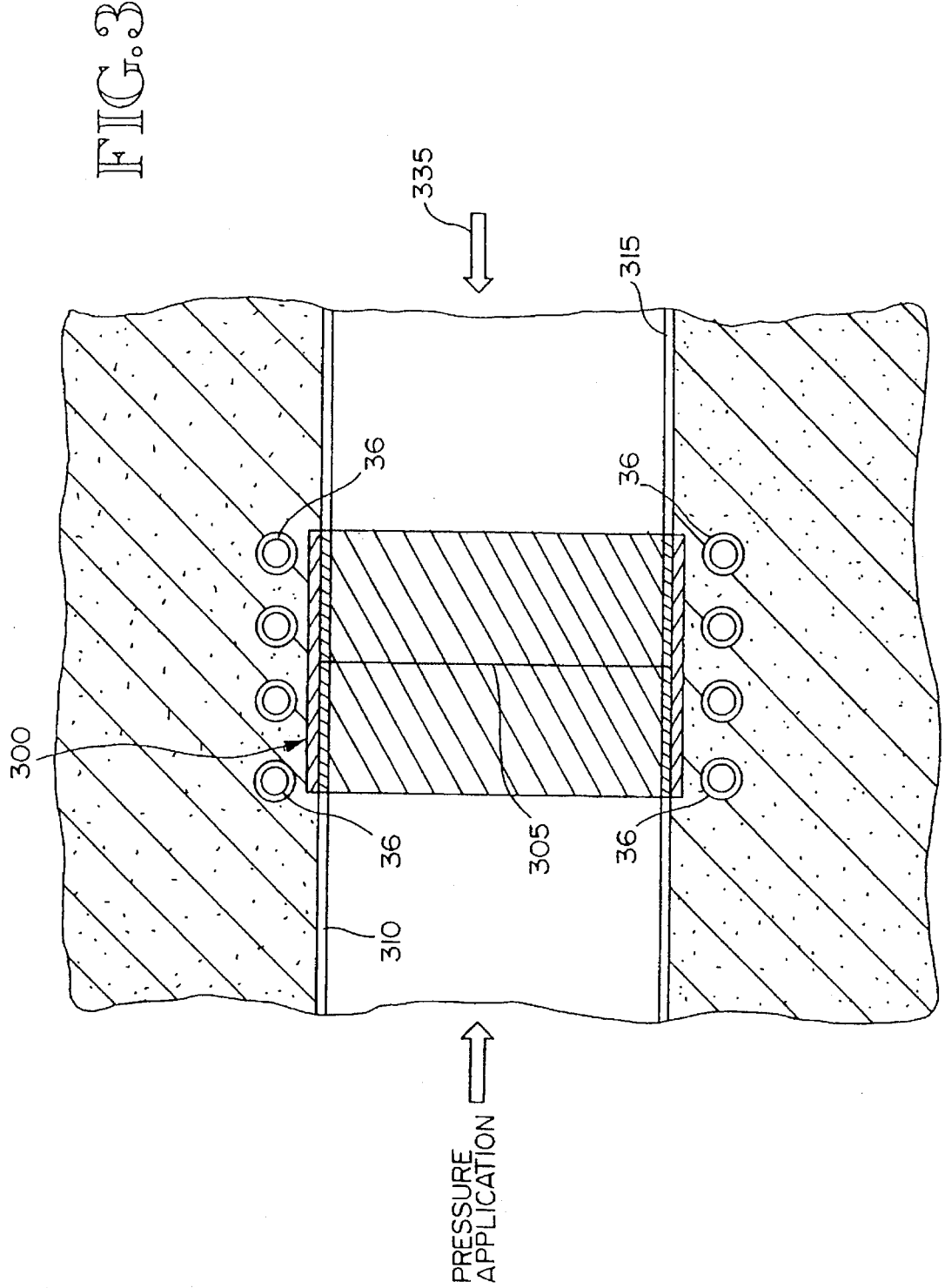
FIG. 3 is a schematic sectional view of our induction heating workcell adapted for brazing of large aerospace structure.

For brazing metal as shown in FIG. 3, we prefer to use a cobalt alloy "smart" susceptor 300 as described in our pending U.S. patent application Ser. No. 08/469,604 entitled: "Method for Achieving Thermal Uniformity in Induction Processing of Organic Matrix Composites or Metals," which we incorporate by reference. This susceptor 300 forms a liner for the dies 20 & 22 in the vicinity of the braze joint 305 to provide localized, efficient, uniform heating, thereby eliminating the need to heat the entire workpiece. We inject an inert atmosphere (i.e., argon gas) around the parts 310 & 315 being produced (i.e., the workpiece) to protect them against oxidation.

Figure 4:
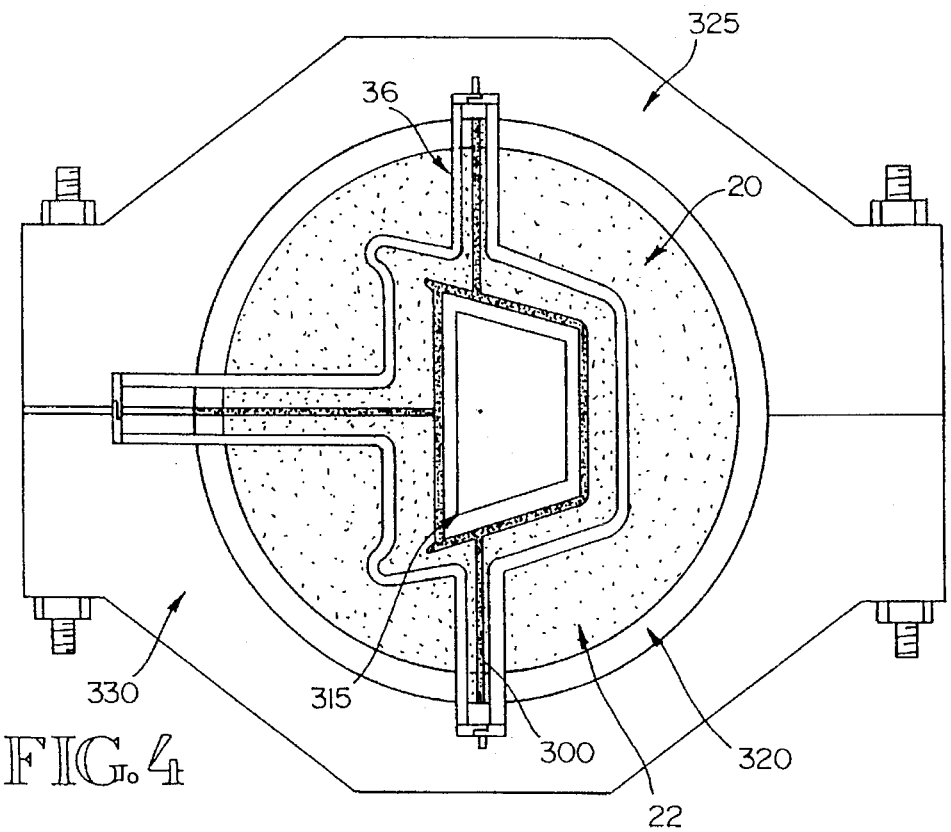
FIG. 4 is another schematic sectional view, similar to FIG. 3, but rotated 90°.

Using a smart susceptor liner 300 reduces the need for a uniform magnetic field because the susceptor is self-regulating in temperature at its Curie temperature. Therefore, complex shapes can be processed in the apparatus because the braze joint is subjected to a uniform temperature through an efficient heating process. Achieving a uniform temperature for the entire parts 310 & 315 would be difficult because of their size, mass, and contour, but, as shown in FIG. 4, the liner can match the contour to provide focused heating upon the braze joint bondline. Generally the liner is narrow, about 2–5 in centered on the bondline. We make the liner as narrow as possible while achieving proper heating at the bondline to form a uniform braze joint. We usually can accomplish this goal with a 2 in wide liner strip.

As shown in FIG. 4, the ceramic dies 20 & 22 are supported in a dielectric container 320 and dielectric strongbacks 325 & 330 that hold the dimension of the part when it heats. In our equipment, for a large titanium part, the smart susceptor and braze joint will reach a temperature of about 1950° F. (1066° C.) while the temperature of the container and strongbacks will be ambient because of the insulating qualities of the ceramic and the active cooling water network associated with the induction coil.

The smart susceptor 300 is 0.040 in thick, which makes it an efficient energy converter at one frequency. It has relatively small mass and, accordingly, heats and cools rapidly. The parts 310 and 315 typically are halves of a forward boom for a fighter aircraft, about 0.5 in thick titanium with peripheral dimensions of about 42×27×19×22 in counterclockwise respectively in FIG. 4. Only a small portion is heated, which again saves energy, simplifies the operation, holds overall dimensional tolerance, and reduces the possibility of warpage.

Figure 6:
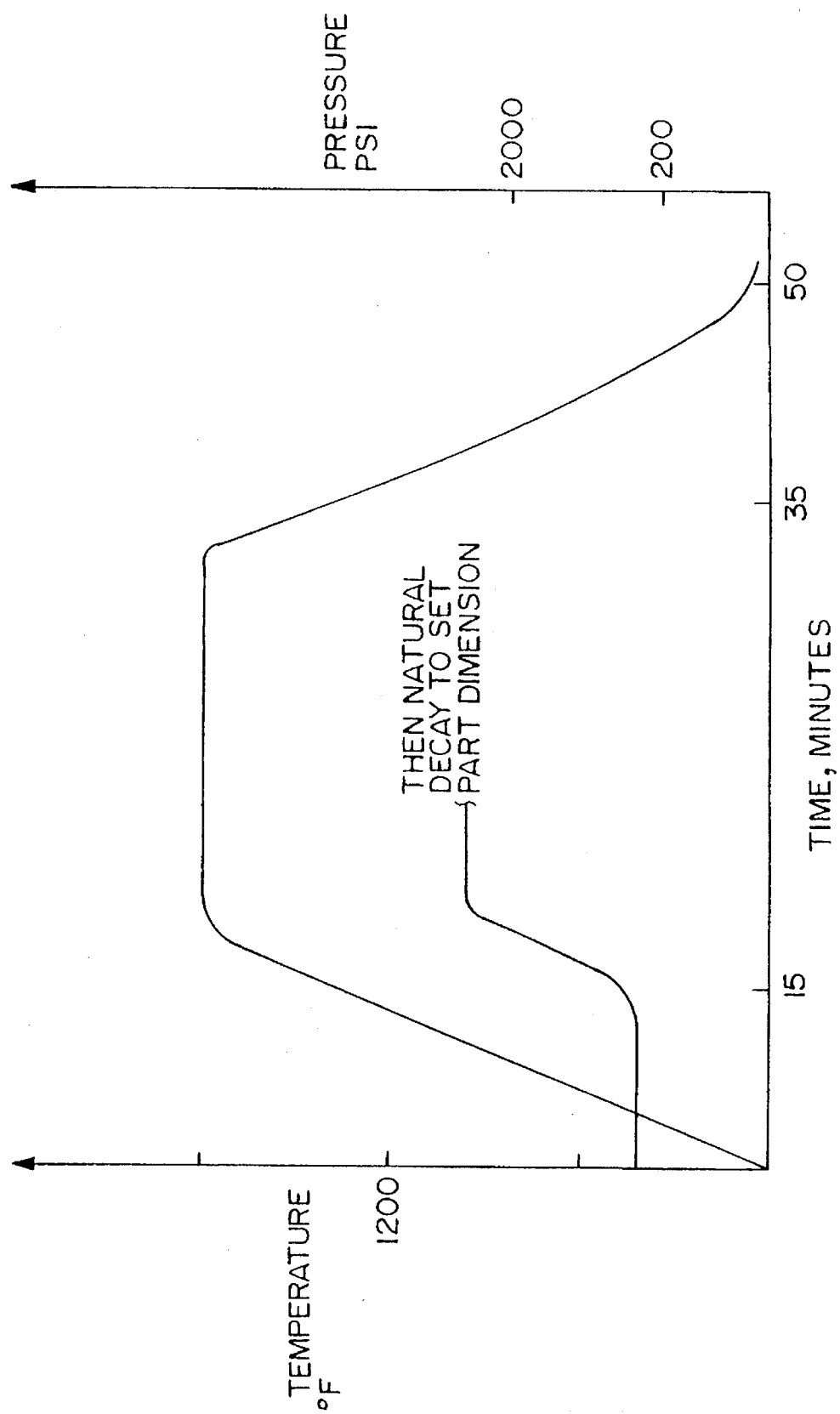
FIG. 6 is a typical temperature/pressure cycle for the brazing process of the present invention.

The pressure and heat (FIG. 6) produces a superior joint where the diffusion of the braze alloy species into the bulk metal of the parts makes the joint nearly indistinguishable from the bulk metal when the part is complete. We energize the coil 36 to heat the liner 300 to its Curie temperature of about 1950° F. (about 15–20 min. after energizing the coil). We maintain the temperature and pressure for about 15–20 min until we have the desired final dimensions before cooling the part while letting the pressure decay naturally to set the part dimension. We believe we can use the process to join large titanium parts of complex curvature having strict dimensional tolerances and strength requirements, producing quality parts that are difficult or impossible to make by any other process. We join parts to form assemblies that could not be machined as a unified whole because of the complex curvatures and interferences.

Figure 5:
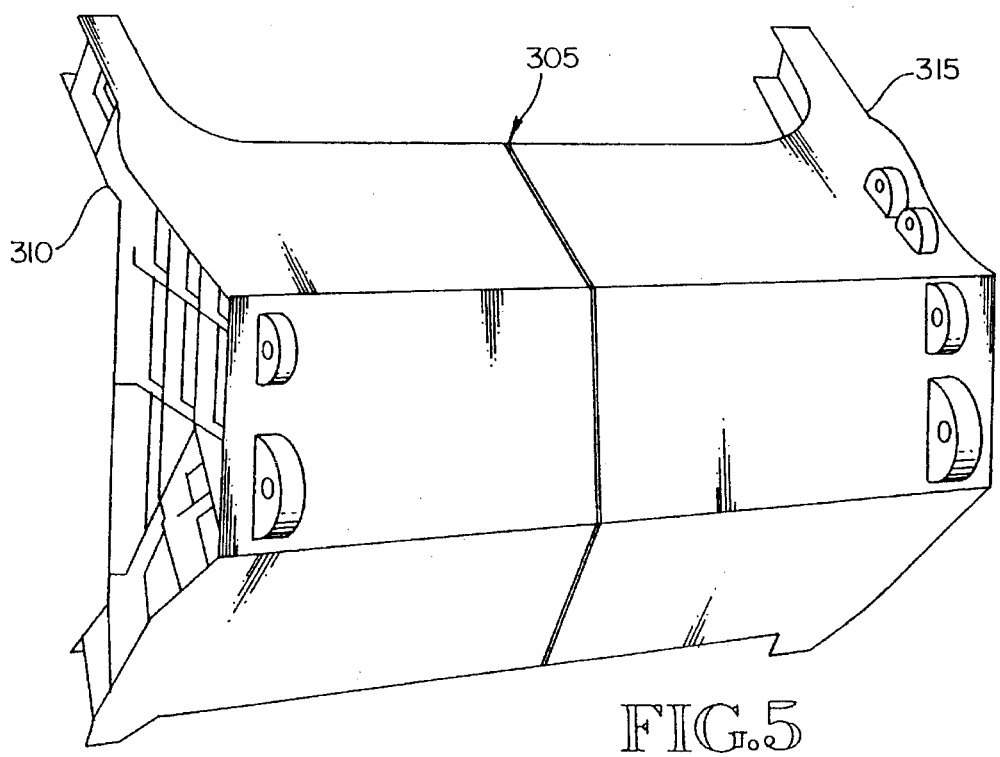
FIG. 5 is a perspective view of a structure we braze in the process of the present invention.

For the formed boom shown in FIG. 5, we position the halves to define the bondline using braze alloy on the clean faces. When we attain the bonding temperature localized at the bondline, we raise the pressure rapidly and monitor the part location looking for lateral movement of about 0.10 in as the bond forms between the 0.50 in thick part. We release the pressure when we have reached the exact final dimensions of the part. The joint should be substantially indistinguishable from the bulk metal when the joining is complete.

We can also diffusion bond in this process, although we prefer brazing. The localized heating and high pressure forms a quality diffusion bond.

We clean the surfaces of the joint interface by using chemical etchants to provide an oxide-free (pure metal) surface for brazing or bonding.

The liner made from the "smart" susceptor functions like the retort in our earlier processes but has the added advantage that it allows localized heating of the bondline. Localized heating means that we avoid loss of dimensions in the remote portions of the parts. Because it has a uniform temperature because of the Curie temperature phenomenon, the liner can be curving sheet (i.e., a thin band or ribbon) that maps the contour of the part, as shown in FIG. 4.

The bondline typically is a flat surface nominal to the pressure rams 335, as shown in FIG. 3. If not a straight face a the joint, then the parts should be profiled to provide substantially uniform pressure in the bondline.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A method for joining large metal aerospace structure made by joining two workpieces using localized induction heating provided by an induction coil to heat the structure along a bondline to a joining temperature to reduce processing time and energy consumption, comprising the steps of:

(a) assembling at least two workpieces to define an assembly having a joint interface at the bondline to form the structure;

(b) placing the assembly in an induction heating press with the bondline adjacent a surrounding ribbon coil susceptor susceptible for induction heating and incorporated into a wall of a die adjacent the joint interface;

(c) energizing the induction coil to heat the susceptor and thereby to heat the workpieces locally at the joint interface;

(d) applying pressure by pushing the workpieces together laterally when the bondline reaches the joining temperature to produce a jointed part having a geometry;

(e) monitoring the geometry of the joined part; and (f) de-energizing the coil.

2. The method of claim 1 wherein the induction heating press includes ceramic dies in which the induction coil is embedded, energizing involves flowing alternating current through the coil at a frequency of about 3–10 kHz, and a braze alloy is sandwiched by the workpieces at the bondline and melts at the joining temperature to braze the workpieces together.

3. A product of the method of claim 1 in the form of a boom.

4. An induction heating apparatus for brazing metal parts together with a braze joint, comprising:

(a) matching cast ceramic dies having mating surfaces and an inset susceptor liner on a narrow portion of the mating surfaces, the liner being aligned at the braze joint; and (b) an induction coil embedded in the dies adjacent to the liner.

5. The method of claim 1 further comprising the step of:

locating a braze alloy having a melting temperature along the bondline wherein energizing heats the braze alloy to its melting temperature and wherein the energizing and pressure application steps produce a braze joint at the bondline.

6. The method of claim 1 wherein at least one workpiece is titanium.

7. The method of claim 5 wherein at least one workpiece is titanium.

8. The method of claim 2 wherein the workpieces are titanium.

9. A product of the method of claim 2 in the form of a boom.

10. The apparatus of claim 4 further comprising means for injecting inert gas around the metal parts.

11. The method of claim 1 further comprising the step of cleaning the joint interface to provide an oxide-free surface for bonding.

12. An energy efficient method for joining at least two workpieces into large metal aerospace structure at a joint formed along a bondline, the method using localized induction heating from a surrounding induction coil to heat a localized portion of the structure in the vicinity of the joint, the coil having a longitudinal axis, the method comprising the steps of:

(a) assembling at least two, metal workpieces in abutting relationship to define a bondline;

(b) placing a braze alloy along the bondline;

(c) positioning the bondline in a press substantially within the induction coil while having lateral portions of the workpieces extend outside the localized portion, the bondline being substantially orthogonal to the longitudinal axis of the coil;

(d) positioning a susceptor between the coil and the workpieces at the bondline, the susceptor defining a heating region of relatively thin lateral dimension centered on the bondline, the susceptor being susceptible to induction heating and having a Curie temperature substantially the same as the temperature at which the braze alloy melts;

(e) energizing the coil to heat the susceptor to its Curie temperature and, thereby, to heat the workpieces locally at the bondline to the temperature at which the braze alloy melts;

(f) pressing the workpieces laterally inwardly to increase pressure along the bondline when the braze alloy melts while continuing to energize the coil, thereby forming a braze joint between the workpieces at the bondline;

(g) de-energizing the coil and cooling the structure.

13. The method of claim 12 wherein the susceptor is inset into a wall of a ceramic die in a press, the ceramic die defining a lateral support area adjacent the bondline and being shaped to conform to the shape of the workpieces, the ceramic die also providing thermal insulation around the bondline so that heat from the susceptor flows to the workpieces in the vicinity of the bondline rather than to the press.

14. The method of claim 13 further comprising the step of:
monitoring lateral movement of the workpieces inwardly to obtain a desired final geometry.

15. The method of claim 13 wherein the Curie temperature is about 1950° F., the workpieces are titanium, and the pressure is about 2000 psi.

16. The method of claim 15 further comprising the steps of:
(a) cleaning surfaces of the workpieces that abut at the bondline to provide oxide-free, pure metal interface; and
(b) injecting an inert gas around the workpieces while they are being heated to protect them from oxidation.

17. The brazed metal product of the method of claim 16 in the form of a boom.

18. The method of claim 16 wherein the susceptor is about 2 inches wide.

19. The method of claim 12 wherein each workpiece has a flat face so that the bondline is a flat surface normal to the longitudinal axis of the coil.

20. The method of claim 12 wherein the workpieces are profiled to provide a substantially uniform pressure in the bondline.

* * * * *